(12) United States Patent
Guo

(10) Patent No.: US 10,072,697 B2
(45) Date of Patent: Sep. 11, 2018

(54) DUAL-PREVENTION LOCK DEVICE FOR LOCKING A SCREW AND A METHOD FOR LOCKING THE SCREW

(71) Applicant: Chunping Guo, Shanxi (CN)

(72) Inventor: Chunping Guo, Shanxi (CN)

( * ) Notice: Subject to any disclaimer, the term of this patent is extended or adjusted under 35 U.S.C. 154(b) by 236 days.

(21) Appl. No.: 14/381,135

(22) PCT Filed: Jun. 20, 2013

(86) PCT No.: PCT/CN2013/077557
§ 371 (c)(1),
(2) Date: Aug. 26, 2014

(87) PCT Pub. No.: WO2014/008805
PCT Pub. Date: Jan. 16, 2014

(65) Prior Publication Data
US 2015/0023758 A1  Jan. 22, 2015

(30) Foreign Application Priority Data

Jul. 9, 2012 (CN) .......................... 2012 1 0237949

(51) Int. Cl.
*F16B 39/28* (2006.01)
*F16B 39/02* (2006.01)

(52) U.S. Cl.
CPC ............ *F16B 39/28* (2013.01); *F16B 39/028* (2013.01)

(58) Field of Classification Search
CPC .......... F16B 41/00; F16B 35/005; F16B 2/14; F16B 2/12; F16B 7/0493; F16B 7/187;
(Continued)

(56) References Cited

U.S. PATENT DOCUMENTS 289,334 A * 11/1883 Brewer .................. F16G 11/00
  16/205
1,039,576 A * 9/1912 Mueller et al. ....... F16B 41/007
  24/279
(Continued)

FOREIGN PATENT DOCUMENTS

CN          2435481 Y       6/2001
CN          2526416 Y       12/2002
(Continued)

OTHER PUBLICATIONS

International Search Report for PCT/CN2013/077557 dated Sep. 26, 2013.
(Continued)

*Primary Examiner* — Lloyd A Gall
(74) *Attorney, Agent, or Firm* — Foley & Lardner LLP; James F. Ewing; Paul M. H. Pua

(57) ABSTRACT

A dual-prevention lock device for locking a screw and a method for locking a screw. The dual-prevention lock device comprises: a lower lock body (6); an upper lock body (1) mounted on the lower lock body (6), a receiving space for receiving a screw (3) to be locked being formed between the upper lock body (1) and the lower lock body (6); and a lock core (11) mounted on the lower lock body (6). A lower clamping part extending into the receiving space is disposed on the lower lock body (6), and an upper clamping part extending into the receiving space is disposed on the upper lock body (1). Under the action of a key, the lower clamping part is pushed by the lock core (11), so that the screw (3) to be locked is locked in the receiving space by the lower clamping part and the upper clamping part. With the upper and lower clamping parts for locking the screw, the dual-prevention lock device has a reliable performance and a simple structural design.

10 Claims, 2 Drawing Sheets

(58) Field of Classification Search
CPC ........ F16B 39/28; F16B 39/028; F16B 39/04; Y10T 403/32532; Y10T 403/3961; Y10T 403/7062; Y10T 403/7066
USPC ............ 70/229–232, DIG. 57; 411/128, 393, 411/910, 285, 288, 209, 315; 403/315–328, 109.3, DIG. 9
See application file for complete search history.

(56) References Cited

U.S. PATENT DOCUMENTS

| | | | | |
|---|---|---|---|---|
| 1,231,164 A * | 6/1917 | Jahns et al. | ............. | F16K 35/10 137/384 |
| 1,273,922 A * | 7/1918 | Prattinger | ............... | F16G 11/00 24/135 N |
| 1,406,315 A * | 2/1922 | Whittaker | ............... | F16B 39/04 411/294 |
| 1,426,628 A * | 8/1922 | Denison | ................... | B62D 1/16 403/286 |
| 1,934,327 A * | 11/1933 | Ridder | ..................... | B67D 7/32 70/178 |
| 1,963,667 A * | 6/1934 | Mercier | .................. | F16B 39/04 411/295 |
| 2,144,837 A * | 1/1939 | Douglas | .............. | E05B 73/0076 248/643 |
| 2,273,102 A * | 2/1942 | Harris | ................... | F16B 39/284 403/362 |
| 2,870,668 A * | 1/1959 | Flahaut | ................... | F16B 33/02 411/436 |
| 2,910,315 A * | 10/1959 | Stevens | .................. | F16B 2/065 403/367 |
| 3,501,993 A * | 3/1970 | Swenson | ............... | F16B 35/005 411/393 |
| 3,731,504 A * | 5/1973 | Belknap | .............. | E05B 73/0076 411/204 |
| 3,987,653 A * | 10/1976 | Lyon | ..................... | E05B 67/003 70/19 |
| 4,506,917 A * | 3/1985 | Hansen | ................... | F16L 41/12 285/198 |
| 4,844,397 A * | 7/1989 | Skakoon | ............. | A61M 5/1413 248/218.4 |
| 4,912,949 A * | 4/1990 | Bowers | ................... | B25B 5/101 269/249 |
| 4,986,457 A * | 1/1991 | Faris | ................... | E05B 73/0005 223/1 |
| 5,266,057 A * | 11/1993 | Angel, Jr. | ............ | H01R 4/5025 411/393 |
| 5,813,809 A * | 9/1998 | Russum | ................ | F16B 7/1472 403/362 |
| 6,023,800 A * | 2/2000 | Stickley | ............... | A61G 7/0507 248/229.26 |
| 6,428,257 B2 * | 8/2002 | Ostling | ................... | F16B 39/04 411/295 |
| 7,040,832 B2 * | 5/2006 | Hsieh | ...................... | F16B 7/105 248/125.8 |
| 7,083,197 B2 * | 8/2006 | Lutz | ....................... | B62D 1/184 280/775 |
| 7,364,533 B2 * | 4/2008 | Baker | ................ | A63B 22/0605 248/408 |
| 7,473,082 B2 * | 1/2009 | Marielle | ................. | F01C 17/06 403/362 |
| 7,607,876 B2 * | 10/2009 | Hall | ...................... | B30B 11/004 411/110 |
| 8,267,730 B2 * | 9/2012 | Stauch | ................... | H01R 4/307 411/383 |
| 2003/0219307 A1 * | 11/2003 | Schmalzhofer | ......... | F16B 7/187 403/362 |
| 2006/0229500 A1 * | 10/2006 | Schuerch | ............. | A61G 13/101 600/234 |
| 2011/0049868 A1 * | 3/2011 | Mori | ........................ | F16B 2/10 285/188 |
| 2012/0039686 A1 * | 2/2012 | Miller | ................... | B22D 41/00 411/355 |

FOREIGN PATENT DOCUMENTS

| | | |
|---|---|---|
| CN | 2898216 Y | 5/2007 |
| CN | 201614811 U | 10/2010 |
| DE | 10055231 | 5/2002 |
| DE | 20314117 U1 | 2/2004 |
| EP | 1306563 | 5/2003 |

OTHER PUBLICATIONS

Office Action for Colombian Application No. 14-156329-4 dated Jun. 25, 2015 with English translation. (13 pages).
Supplementary European Search Report for EP 13816899.2 dated Feb. 18, 2016. (5 pages).
EP Communication pursuant to Article 94(3)EPC for EP Application No. 13816899.2 dated Feb. 7, 2017. (4 pages).
Communication pursuant to Article 94(3)EPC for EP Application No. 13816899.2 dated Feb. 7, 2017. (4 pages).
Office Action for Australian App. Ser. No. 2013289710 dated Sep. 13, 2016 (3 Pages).
Examination Report CA Application No. 2,863,446 dated Jul. 25, 2017.

* cited by examiner

DUAL-PREVENTION LOCK DEVICE FOR LOCKING A SCREW AND A METHOD FOR LOCKING THE SCREW

RELATED APPLICATIONS

This application is the U.S. National Stage of International Application Number PCT/CN2013/077557, filed Jun. 20, 2013, which claims the benefit of and priority to Chinese Patent Application Number 201210237949.4, filed Jul. 9, 2012. The entire contents of the foregoing applications are hereby incorporated herein by reference for all purposes.

TECHNICAL FIELD

The present disclosure relates to a dual-prevention lock, more particularly relates to a dual-prevention lock device for locking a screw and a method for locking the screw.

BACKGROUND

According to the Standard GB3836.1-2010 for the Interlocking Device, it requires that the structure of an interlocking device should guaranty that its functions cannot be removed easily by non-dedicated tools, to maintain the interlocking device specially for explosion protection. According to the Requirement of the Rule 445 in Safety Regulations in Coal Mine, lock devices of all switches must reliably prevent power from being transmitted unauthorized and prevent open operation from being performed unauthorized. Currently, in various explosive hazardous areas, especially in electric apparatuses used for underground coal mine, a dual-prevention lock is mounted on the locking device of the electric apparatuses for preventing open operation from being performed unauthorized by unprofessional person and for preventing power from being transmitted unauthorized (referred to as "dual-prevention"), thereby ensuring the safe usage of the electric apparatuses.

A Chinese patent ZL 200620024380.3 discloses a safety lock which requires that a locking opening must be machined in a locked screw of an explosion-proof electric equipment. However, there will be a situation occurring that the locking opening is not machined by workers as required in practical installation process, resulting in that the safety lock fails, without preventing power from being transmitted unauthorized and preventing open operation from being performed unauthorized. Thereby there is potential safety hazard.

SUMMARY

An object of the present disclosure is to overcome problems in the prior art, and a dual-prevention lock device for locking a screw is provided, in which the screw is locked by setting an upper clamping part and a lower clamping part so that a switch from a lock status to an unlock status is performed by jumping from "0" to "1", instead of changing continuously. Thus the dual-prevention lock device has a reliable performance and a simple structure design.

In order to realize the object described above of the present solution, some technical solutions are provided as follows.

A dual-prevention lock device for locking a screw which comprises: a lower lock body; an upper lock body mounted on the lower lock body, a receiving space for receiving a screw to be locked is formed between the upper lock body and the lower lock body; and a lock core mounted in the lower lock body; wherein a lower clamping part extending into said receiving space is disposed on the lower lock body, and an upper clamping part extending into said receiving space is mounted on the upper lock body; the lower clamping part is pushed by the lock core with the action of a key, so that the screw is locked securely within said receiving space by the lower clamping part and the upper clamping part.

Preferably, a plurality of bolts are fixed to the upper lock body, with the tip of each bolt extending into the receiving space to form the upper clamping part; the distance between adjacent tips of the bolts is unequal to an integral multiple of the pitch in the screw to be locked, in the axial direction of the screw to be locked.

Or alternatively, the upper clamping part can be threads disposed on the upper lock body, with the form of the threads different from that of the screw to be locked, or the pitch of the threads unequal to an integral multiple of the pitch in the screw to be locked.

Or alternatively, the upper clamping part is a friction plate fixed to the upper lock body.

Wherein, a first arc groove is formed in the bottom of the upper lock body, and a second arc groove is formed in the top of the lower lock body, with the receiving space formed by being surrounded by the first arc groove and the second arc groove; the lower clamping part is a supporting pad disposed in the second arc groove.

Preferably, a plurality of bolts are so fixed to the supporting pad that the tip of each bolt extends upwardly out of the supporting pad; the distance between adjacent tips of the bolts is unequal to an integral multiple of the pitch in the screw to be locked, in the axial direction of the screw to be locked.

Or alternatively, threads are disposed on the top of the supporting pad, with the form of the threads different from that of the screw to be locked, or the pitch of the threads unequal to an integral multiple of the pitch in the screw to be locked.

Or alternatively, a friction plate is fixed to the top of the supporting pad.

Preferably, a receiving hole and a screw hole which is connected to the receiving hole and extends to the supporting pad are formed in the lower lock body, so that a lock core is threadedly connected (or connected via thread(s)) to the screw hole and the head of the lock core is disposed within the receiving hole.

Specially, a groove matched with the tail of the lock core is formed in the bottom of the supporting pad.

Moreover, the dual-prevention lock device further comprises a lock core anti-slack device mounted in the lower lock body. The lock core anti-slack device comprises: a mounting hole juxtaposed with the screw hole, the bottom of the mounting hole is communicated with the receiving hole to form a step, the top of the mounting hole is sealed; an anti-slack block disposed in the bottom of the mounting hole; and a spring disposed within the mounting hole above the anti-slack block; wherein a notch matched with the bottom of the anti-slack block is formed in the head of the lock core.

In another aspect of the present disclosure, a method for locking a screw with a dual-prevention lock device is provided, wherein the dual-prevention lock device can be any one of devices described above. The method comprises steps as follows:

1) the screw is placed between an upper clamping part of an upper lock body and a lower clamping part of a lower lock body;

2) a key is mated with a head of a lock core and then is rotated, so that the lock core rotates relative to the lower lock body while the lower clamping part is jacked up by the lock core;

3) the screw rises along with the lower clamping part, until the screw is locked by the upper clamping part and the lower clamping part.

Preferably, a plurality of bolts are fixed to the upper lock body, with the tip of each bolt extending into the receiving space to form the upper clamping part; the distance between adjacent tips of the bolts is unequal to an integral multiple of the pitch in the screw to be locked, in the axial direction of the screw to be locked.

Or alternatively, the upper clamping part is threads disposed on the upper lock body, with the form of the threads different from that of the screw to be locked, or the pitch of the threads unequal to an integral multiple of the pitch in the screw to be locked.

Preferably, a first arc groove is formed in the bottom of the upper lock body, and a second arc groove is formed in the top of the lower lock body, with the receiving space formed by being surrounded by the first arc groove and the second arc groove; the lower clamping part is a supporting pad disposed in the second arc groove.

Advantages of the present solution are embodied in that:

1) The tips of the bolts for clamping the screw to be locked are disposed in the bottom of the upper lock body, and the distance between adjacent tips of the bolts is unequal to an integral multiple of the pitch in the screw to be locked, in the axial direction of the screw to be locked. Thus, the screw cannot be rotated arbitrarily after the screw is locked by the tips of the bolts and the supporting pad, and a switch from a lock status to an unlock status is performed by jumping from "0" to "1", instead of changing continuously, ensuring a performance of the dual-prevention lock device reliable.

2) The dual-prevention lock device of the present disclosure has a simple structure design and can lock the screw simply and easily.

A LIST OF REFERENCE NUMBERS

Figure 1:
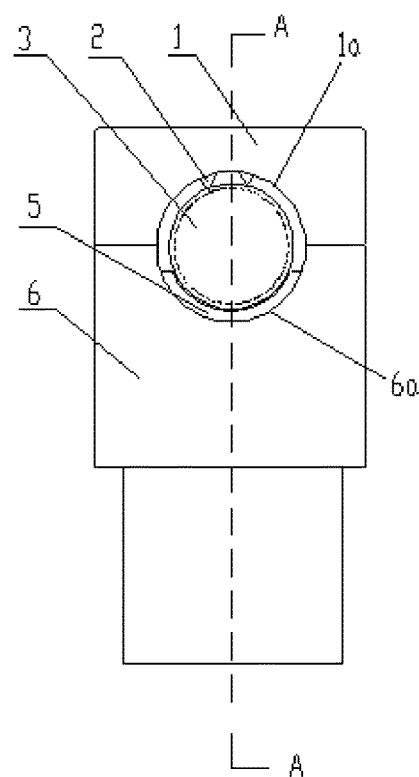
FIG. 1 is a structure diagram showing a dual-prevention lock device for locking a screw in accordance with an embodiment of the present solution.

1: an upper lock body
1a: a first arc groove
2: a bolt
3: a screw to be locked
4: a bolt
5: a supporting pad
5a: a recess
6: a lower lock body
6a: a second arc groove
6b: a screw hole
6c: a receiving hole
60: a mounting hole
9: a spring
10: an anti-slack block
11: a lock core

DETAILED DESCRIPTION

FIG. 1 is a structure diagram of a dual-prevention lock device for locking a screw in accordance with an embodiment of the present solution. As shown in FIG. 1, the dual-prevention lock device for locking a screw according to the present disclosure comprises: a lower lock body 6; an upper lock body 1 mounted on the lower lock body 6, wherein there is a receiving space for receiving a screw to be locked that is formed between the upper lock body 1 and the lower lock body 6; and a lock core 11 mounted on the lower lock body 6. A lower clamping part extending into the receiving space is disposed on the lower lock body 6, and an upper clamping part extending into the receiving space is mounted in the upper lock body 1. The lower clamping part is pushed by the lock core 11 with the action of a key, so that the screw 3 to be locked is locked in the receiving space by the lower clamping part and the upper clamping part.

Figure 3:
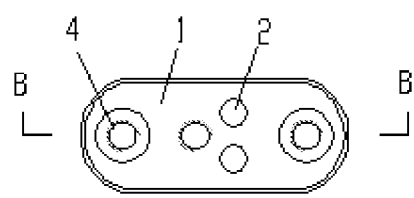
FIG. 3 is a top view of an upper lock body of FIG. 1.
Figure 3A:
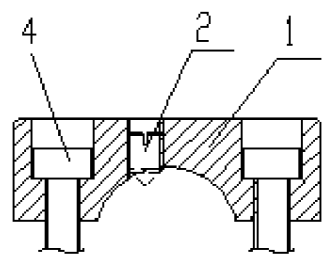
FIG. 3a is a sectional view taken along a section line B-B of FIG. 3.

As shown in FIG. 3a, a plurality of bolts 2 are fixed to the upper lock body 1 so that each of the bolts 2 extends into the receiving space at a respective tip thereof, thereby forming the upper clamping part described above. A distance between two adjacent tips of the bolts is unequal to an integral multiple of the pitch in the screw 3 to be locked, in the axial direction of the screw 3 to be locked.

Figure 2:
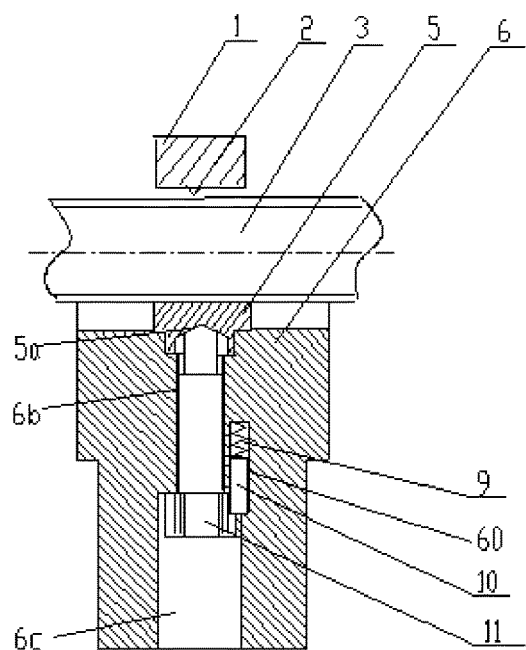
FIG. 2 is a sectional view taken along a section line A-A of FIG. 1.

Specifically, as shown in FIGS. 1 and 2, a first arc groove 1a is formed on the bottom of the upper lock body 1, and a second arc groove 6a is formed on the top of the lower lock body 6. The upper lock body 1 and the lower lock body 6 are connected to each other by bolts 4 so that the receiving space described above is formed by being surrounded by the first arc groove 1a and the second arc groove 6a. As shown in FIGS. 3 and 3a, the plurality of bolts 2 are fixed to the upper lock body 1, with the tip of each bolt 2 extending downward out of the first arc groove 1a, so that the tip of each bolt 2 extends into the receiving space to form the upper clamping part described above. The distance between two adjacent tips of the bolts in the axial direction of the screw 3 to be locked, is unequal to an integral multiple of the pitch in the screw 3 to be locked, with the result that the screw 3 cannot move axially by rotation and can not be screwed by common tools, after the screw 3 to be locked by the upper clamping part and the lower clamping part, thereby preventing the dual-prevention lock device from failure caused by unprofessional people arbitrarily screwing the screw 3.

In the present disclosure, alternatively, threads (not shown in the drawings) which constitute the upper clamping part described above may be provided within the first arc groove, with the form of the threads differing from that of the screw 3 to be locked or the pitch of the threads unequal to an integral multiple of the pitch in the screw 3 to be locked.

In the present disclosure, alternatively, a friction plate (not shown in the drawings) which constitutes the upper clamping part may be fixed within the first arc groove 1a. The friction plate may be made by materials such as rubbers and brake bands.

The lower clamping part according to the present disclosure can be a supporting pad 5 which is disposed within the second arc groove 6a located on the top of the lower lock body 6.

As shown in FIG. 2, a receiving hole 6c and a screw hole 6b which is connected to the receiving hole 6c and extends to the second arc groove 6a, are disposed in the lower lock body 6 of the present solution. The supporting pad 5 is disposed within the second arc groove 6a and located in the top of the screw hole 6b.

The receiving hole 6c is coaxially communicated with the screw hole 6b, and the tail of the lock core 11 is inserted into the screw hole 6b through the receiving hole 6c and then is threadedly connected (or connected via thread(s)) to the screw hole 6b, with the head of the lock core 11 being positioned within the receiving hole 6c. The supporting pad 5 has a contour shape at the top thereof matched with the screw 3 to be locked, and has a recess 5a at a bottom thereof matched with the tail of the lock core 11, such that the tail of the lock core 11 will be inserted into the recess 5a when the lock core 11 is screwed to move upwardly. If the lock core 11 is continuously screwed to continue to move upwardly, the supporting pad 5 is jacked up by the lock core 11, thereby the screw 3 to be locked which is disposed on the supporting pad 5 rising along with the supporting pad 5 until the screw 3 to be locked being clamped by the supporting pad 5 and the plurality of tips of the bolts in the bottom of the upper lock body 1. Thus the locking of the screw 3 is realized.

In the present disclosure, alternatively, a plurality of bolts (not shown in the drawings) also may be fixed to the supporting pad 5, with the tip of each bolt extending upwardly out of the supporting pad 5. A distance between two adjacent tips of the bolts is unequal to an integral multiple of the pitch in the screw 3 to be locked, in the axial direction of the screw 3 to be locked.

Or alternatively, threads (not shown in the drawings) may be provided on the top of the supporting pad 5, with the form of the threads differing from that of the screw 3 to be locked or the pitch of the threads unequal to an integral multiple of the pitch in the screw 3 to be locked.

Or alternatively, a friction plate (not shown in the drawings) may be fixed to the top of the supporting pad 5.

Moreover, the dual-prevention lock device in the present solution further comprises a lock core anti-slack device comprising a mounting hole 60 which is juxtaposed with the screw hole 6b. The mounting hole 60 on the bottom thereof has a side near to the receiving hole 6c, which is communicated with the receiving hole 6c, and has another side away from the receiving hole 6c, which constitutes a step along with a side wall of the receiving hole 6c. A top of the mounting hole 60 is sealed. An anti-slack block 10 which is disposed within the mounting hole 60 is supported on the step, and a spring 9 is disposed within the mounting hole 60 above the anti-slack block 10. A notch matched with a bottom of the anti-slack block 10 is formed in the head of the lock core 11.

A process for locking the screw by the dual-prevention lock device will be described in detail with reference to FIGS. 1 and 2.

First, the screw 3 to be locked extends through the receiving space between the upper lock body 1 and the lower lock body 6 and is disposed within the receiving space.

Then, the lock core 11 is operated with a special key (not shown in the drawings) to be rotated toward one direction, so that the lock core 11 moves upwardly along the screw hole 6b. The lock core 11 move upwardly, until the anti-slack block 10 is mated with the notch in the head of the lock core 11, thereby the lock core 11 not continuing to move upwardly. The key is forced upwardly to move upwardly the anti-slack block 10 by overcoming the force of the spring 9, so that the engaging action between the anti-slack block 10 and the head of the lock core disappears. The key is forced while the lock core 11 is rotated continuously, so that the lock core 11 continues to move upwardly. The supporting pad 5 is jacked up by the lock core 11, until the screw 3 to be locked is clamped with the cooperation of the plurality of the tips of the bolts and the supporting pad 5. Thus, the screw 3 to be locked can not move axially by rotation and the lock core 11 can not continue to rotate.

Afterward, the key is pulled slightly outwardly, so that the anti-slack block 10 is snapped into the notch in the head of the lock core to engage with the lock core with the action of the spring. At that time, the lock core cannot rotate in any direction unless a special key is used, thereby realizing the locking of the screw 3.

If the locking of the screw needs to be released, the special key is inserted into the receiving hole 6c to push inwardly the anti-slack block 10 so that the engagement between the anti-slack block 10 and the head of the lock core is removed. The key is forced while the lock core 11 is rotated in a reverse direction, so that the lock core 11 and the supporting pad 5 disposed on the top of the lock core 11 descend, thereby releasing the locking of the screw by the plurality of the tips of bolts and the supporting pad 5. Thus the unlocking of the screw is realized.

While the present invention has been described above in detail, the present invention is not so limited. Many modifications can be made by the skilled in the art according to the principle of the present invention, thus it is should understood that various modifications made according to the principle of the present invention fall within the scope of the present invention.

The invention claimed is:

1. A dual-prevention lock device for locking a screw, the dual-prevention lock device comprising:
   a screw (3) to be locked;
   a lower lock body (6);
   an upper lock body (1) mounted on the lower lock body (6), a receiving space for receiving the screw (3) to be locked being formed between the upper lock body (1) and the lower lock body (6);
   a lock core (11) mounted in the lower lock body (6);
   a lower clamping part extending into the receiving space, disposed on the lower lock body (6), and an upper clamping part extending into the receiving space is mounted on the upper lock body (1); the lower clamping part is configured to be pushed by the lock core (11) with the action of a key mated with a head of the lock core, so that the screw (3) to be locked is locked within the receiving space by the lower clamping part and the upper clamping part;
   a plurality of bolts (2) fixed to the upper lock body (1), with the tip of each bolt (2) extending into the receiving space to form the upper clamping part; wherein a distance between adjacent tips of the bolts is unequal to an integral number of times of the pitch in the screw (3) to be locked, in the axial direction of the screw (3) to be locked, and a first arc groove (1a) is formed in the bottom of the upper lock body (1), a second arc groove (6a) is formed in the top of the lower lock body (6), with the receiving space formed by being surrounded by the first arc groove (1a) and the second arc groove (6a), and the lower clamping part is a supporting pad (5) disposed in the second arc groove (6a); and
   a plurality of bolts fixed to the supporting pad (5) with the tip of each bolt extending upwardly out of the supporting pad (5), the distance between adjacent tips of the bolts fixed to the supporting pad (5) is unequal to an integral number of times of the pitch in the screw (3) to be locked.

2. A method for locking a screw with a dual-prevention lock device according to claim 1, the method comprising the following steps:

1) the screw being disposed between the upper clamping part of the upper lock body (1) and the lower clamping part of the lower lock body (6);
2) a key being mated with the head of the lock core (11) and then being rotated, such that the lock core (11) rotating relative to the lower lock body (6) while the lower clamping part being jacked up by the lock core (11);
3) the screw rising along with the lower clamping part, until the screw is locked by the upper clamping part and the lower clamping part.

3. A dual-prevention lock device for locking a screw, the dual-prevention lock device comprising:
   a screw (3) to be locked;
   a lower lock body (6);
   an upper lock body (1) mounted on the lower lock body (6), a receiving space for receiving the screw (3) to be locked being formed between the upper lock body (1) and the lower lock body (6);
   a lock core (11) mounted in the lower lock body (6);
   a lower clamping part extending into the receiving space, disposed on the lower lock body (6);
   an upper clamping part extending into the receiving space, mounted on the upper lock body (1), the lower clamping part configured to be pushed by the lock core (11) with the action of a key mated with a head of the lock core, so that the screw (3) to be locked is locked within the receiving space by the lower clamping part and the upper clamping part, the upper clamping part comprising threads disposed on the upper lock body (1), with the form of the threads being different from that of the screw to be locked, or the pitch of the threads being unequal to an integral number of times of the pitch of the screw (3) to be locked, and a first arc groove (1a) is formed in the bottom of the upper lock body (1), a second arc groove (6a) is formed in the top of the lower lock body (6), with the receiving space formed by being surrounded by the first arc groove (1a) and the second arc groove (6a), and the lower clamping part is a supporting pad (5) disposed in the second arc groove (6a), and
   a plurality of bolts fixed to the supporting pad (5) with the tip of each bolt extending upwardly out of the supporting pad (5), the distance between adjacent tips of the bolts fixed to the supporting pad (5) is unequal to an integral number of times of the pitch in the screw (3) to be locked.

4. The dual-prevention lock device according to claim 3, characterized in that a receiving hole (6c) and a screw hole (6b) which is connected to the receiving hole (6c) and extends to the supporting pad (5) are formed in the lower lock body (6), so that the lock core (11) is connected via thread to the screw hole (6b) and the head of the lock core (11) is placed within the receiving hole (6c).

5. The dual-prevention lock device according to claim 4, characterized in that a recess (5a) matched with the tail of the lock core (11) is formed in the bottom of the supporting pad (5).

6. The dual-prevention lock device according to claim 5, characterized in that it further comprises a lock core anti-slack device mounted in the lower lock body (6), the lock core anti-slack device comprising:
   a mounting hole (60) juxtaposed with the screw hole (6b), the bottom of which is communicated with the receiving hole (6c) to form a step, and the top of the mounting hole is closed;
   an anti-slack block (10) disposed in the bottom of the mounting hole (60);
   a spring (9) disposed within the mounting hole (60) above the anti-slack block (10);
   wherein a notch matched with the bottom of the anti-slack block (10) is formed in the head of the lock core (11).

7. A method for locking a screw with a dual-prevention lock device according to claim 3, the method comprising the following steps:
   1) the screw being disposed between the upper clamping part of the upper lock body (1) and the lower clamping part of the lower lock body (6);
   2) a key being mated with the head of the lock core (11) and then being rotated, such that the lock core (11) rotating relative to the lower lock body (6) while the lower clamping part being jacked up by the lock core (11);
   3) the screw rising along with the lower clamping part, until the screw is locked by the upper clamping part and the lower clamping part.

8. A method for locking a screw with a dual-prevention lock device according to claim 4, the method comprising the following steps:
   1) the screw being disposed between the upper clamping part of the upper lock body (1) and the lower clamping part of the lower lock body (6);
   2) a key being mated with the head of the lock core (11) and then being rotated, such that the lock core (11) rotating relative to the lower lock body (6) while the lower clamping part being jacked up by the lock core (11);
   3) the screw rising along with the lower clamping part, until the screw is locked by the upper clamping part and the lower clamping part.

9. A method for locking a screw with a dual-prevention lock device according to claim 5, the method comprising the following steps:
   1) the screw being disposed between the upper clamping part of the upper lock body (1) and the lower clamping part of the lower lock body (6);
   2) a key being mated with the head of the lock core (11) and then being rotated, such that the lock core (11) rotating relative to the lower lock body (6) while the lower clamping part being jacked up by the lock core (11);
   3) the screw rising along with the lower clamping part, until the screw is locked by the upper clamping part and the lower clamping part.

10. A method for locking a screw with a dual-prevention lock device according to claim 6, the method comprising the following steps:
    1) the screw being disposed between the upper clamping part of the upper lock body (1) and the lower clamping part of the lower lock body (6);
    2) a key being mated with the head of the lock core (11) and then being rotated, such that the lock core (11) rotating relative to the lower lock body (6) while the lower clamping part being jacked up by the lock core (11);
    3) the screw rising along with the lower clamping part, until the screw is locked by the upper clamping part and the lower clamping part.

* * * * *